(12) United States Patent
Pease

(10) Patent No.: US 11,555,565 B2
(45) Date of Patent: Jan. 17, 2023

(54) SEAL RING AND HOSE CONNECTOR ASSEMBLY

(71) Applicant: Fiskars Finland Oy Ab, Helsinki (FI)

(72) Inventor: Dan Pease, Walker, IA (US)

(73) Assignee: Fiskars Finland Oy Ab, Espoo (FI)

( * ) Notice: Subject to any disclaimer, the term of this patent is extended or adjusted under 35 U.S.C. 154(b) by 48 days.

(21) Appl. No.: 17/247,804

(22) Filed: Dec. 23, 2020

(65) Prior Publication Data
US 2022/0196190 A1    Jun. 23, 2022

(51) Int. Cl.
*F16L 17/025* (2006.01)
*F16J 15/10* (2006.01)
*F16L 33/18* (2006.01)

(52) U.S. Cl.
CPC ........... *F16L 17/025* (2013.01); *F16J 15/104* (2013.01); *F16L 33/18* (2013.01)

(58) Field of Classification Search
CPC .. F16J 15/02; F16J 15/06; F16J 15/061; F16J 15/10; F16J 15/104; F16J 15/12; F16J 15/121; F16L 17/025; F16L 33/18; F16L 33/223
See application file for complete search history.

(56) References Cited

U.S. PATENT DOCUMENTS

| | | | | |
|---|---|---|---|---|
| 3,106,406 A | * | 10/1963 | Liebig | F16J 15/3272 277/560 |
| 3,214,182 A | * | 10/1965 | Herbruggen | F16J 15/32 277/465 |
| 3,871,668 A | * | 3/1975 | Coker | F16J 15/127 277/913 |
| 4,088,327 A | * | 5/1978 | Bachle | F16B 43/001 285/23 |
| 5,085,250 A | * | 2/1992 | Kendrick | G01F 1/42 138/40 |
| 5,342,096 A | * | 8/1994 | Bachle | F16L 19/0212 285/379 |
| 7,073,796 B2 | * | 7/2006 | Tanioka | F16L 15/008 285/23 |
| D785,144 S | * | 4/2017 | Kitagawa | D23/269 |
| 9,739,378 B2 | * | 8/2017 | Vu | F16J 15/0806 |
| 10,359,135 B2 | * | 7/2019 | Cardi | F16L 55/07 |
| 2005/0212291 A1 | * | 9/2005 | Edwards | F16L 23/10 285/364 |
| 2007/0273102 A1 | * | 11/2007 | Schroeder | F16J 15/062 277/312 |

(Continued)

FOREIGN PATENT DOCUMENTS

CN    109027232 A  * 12/2018  ............. F16J 15/104

OTHER PUBLICATIONS

ASTM International, Designation: D2240-15, Standard Test Method for Rubber Property—Durometer Hardness, May 9, 2017, 13 pages.

*Primary Examiner* — Zachary T Dragicevich
*Assistant Examiner* — Alexander T Rufrano
(74) *Attorney, Agent, or Firm* — Foley & Lardner LLP

(57) ABSTRACT

A seal ring has a central axis and an elastic ring member made of elastic material and an annular body portion and a flange surrounding the annular body portion. The thickness of the flange is smaller than the thickness of the annular body portion as measured in the axial direction of the seal ring. A hose connector assembly includes the aforementioned seal ring.

18 Claims, 4 Drawing Sheets

(56) References Cited

U.S. PATENT DOCUMENTS

| | | | |
|---|---|---|---|
| 2008/0048440 A1* | 2/2008 | Anderson | F16L 19/0286 |
| | | | 285/137.11 |
| 2010/0084827 A1* | 4/2010 | Peddle | F16J 15/061 |
| | | | 277/644 |
| 2014/0084018 A1* | 3/2014 | Onillon | F16J 15/34 |
| | | | 221/9 |

* cited by examiner

A-A

SEAL RING AND HOSE CONNECTOR ASSEMBLY

The invention relates to a seal ring, and particularly to a solution, that is designed to be used as a static compression seal in a coupling where compression is provided via threaded connections, in particular a hose coupling. The invention also relates to a hose connector assembly comprising the seal ring.

BACKGROUND OF THE INVENTION

When a hose coupling is connected, the connection often must be sealed to prevent the medium flowing through the coupling from leaking into the environment. Such couplings are also often disconnected when not in use, and reconnected when used. This puts strain on the seal member and exposes it to varying conditions. In practice the seal member must create a watertight seal in the coupling when connected, and must be retained in the female coupling member, when the coupling is disconnected.

In known solutions, the above-mentioned features are implemented either with flat washers or traditional O-rings, that are arranged in the female coupling member, or a fixed seal that is installed in the coupling by the manufacturer.

A problem with the above-mentioned solutions is, that either the traditional seal rings do not have great retention qualities, making them prone to falling out of the female coupling when the coupling is disconnected, or the seal retention is done in a way that the seal cannot be removed and replaced by the consumer.

BRIEF DESCRIPTION OF THE INVENTION

The object of the invention is to introduce an improved seal ring and an improved hose connector assembly, which are improved in terms of retention and sealing qualities. An object is particularly to introduce a solution by which one or more of the above defined problems of prior art and/or problems discussed or implied elsewhere in the description can be solved.

It is brought forward a new seal ring having a central axis and comprising: an elastic ring member made of elastic material and comprising: an annular body portion; and a flange surrounding the annular body portion, wherein the thickness of the flange is smaller than the thickness of the annular body portion as measured in axial direction of the seal ring.

With this solution one or more of the above-mentioned objects can be achieved. Particularly, hereby retention and sealing properties of the seal ring can be improved.

Preferable further details of the seal ring are introduced in the following, which further details can be combined with the seal ring individually or in any combination.

In a preferred embodiment, the flange comprises a plurality of flange portions distributed along the periphery of the annular body portion, each flange portion extending radially outwards from the annular body portion.

In a preferred embodiment, the elastic ring member comprises at least 4 of said flange portions.

In a preferred embodiment, the elastic ring member comprises at least 6 of said flange portions.

In a preferred embodiment, the elastic ring member comprises less than 10 of said flange portions.

In a preferred embodiment, the flange portions cover more than 50% of the periphery of the annular body portion, preferably at least 70%, and more preferably even more.

In a preferred embodiment, the elastic ring member comprises a rounded concave corner between the first and/or second axial side of each said flange portion and the annular body portion.

In a preferred embodiment, each said flange portion comprises two opposite axial sides, and one or more of the flange portions comprises, on at least one of the two axial sides, plurality of protrusions.

In a preferred embodiment, each said flange portion comprises on one of its axial side 3 to 20 of said protrusions.

In a preferred embodiment, each said flange portion comprises the same amount of protrusions.

In a preferred embodiment, said protrusions are elongated ribs.

In a preferred embodiment, said elongated ribs are oriented to point outwards from the central axis of the elastic ring member.

In a preferred embodiment, each said elongated rib has a semi-circular cross section.

In a preferred embodiment, the width/thickness ratio of the cross section of the elastic ring member at the point of each said flange portion is greater than one, preferably greater than 1.10.

In a preferred embodiment, the elastic ring member extends around the axis along a circular path with a constant or non-constant cross section, wherein the cross section is particularly the cross section on one radial side of the axis as viewed along the tangent of the circle.

In a preferred embodiment, the cross section of the elastic ring member at the point of each said flange portion tapers towards its periphery.

In a preferred embodiment, the seal ring comprises a second ring member coaxial with the annular body portion, made of material, which is harder than the elastic material.

In a preferred embodiment, the seal ring comprises a tubular opening extending through it along said central axis.

In a preferred embodiment, the annular body portion and the second ring member (6) together define the tubular opening.

In a preferred embodiment, the second ring member is at least partially embedded in the annular body portion of the elastic ring member.

In a preferred embodiment, the annular body portion is rotationally symmetrical with respect to the axis.

In a preferred embodiment, cross section of the seal ring is symmet-rical with respect to a plane to which the axis is orthogonal.

In a preferred embodiment, in said cross section the width of the annular body portion is greater than the width of the flange portion.

In a preferred embodiment, in said cross section the width of the flange portion is at least 2 mm.

In a preferred embodiment, in said cross section the thickness of the flange portion is smaller than half of the thickness of the annular body portion.

In a preferred embodiment, in said cross section the thickness of the flange portion is smaller than the thickness of the second ring member.

In a preferred embodiment, the elastic ring member has been injection molded on the second ring member.

In a preferred embodiment, said elastic material comprises elastomer, such as silicone.

In a preferred embodiment, Shore A hardness of said elastic material is between 30 and 75, preferably between 50 and 75.

In a preferred embodiment, Shore A hardness of the material of the second ring member is higher than Shore A hardness of the elastic material.

In a preferred embodiment, the whole elastic ring member is made of same material.

In a preferred embodiment, axial sides of the annular body portions are flat.

It is brought forward a new hose connector assembly comprising a female coupling member comprising a cylindrical space and the seal ring according to any of the preceding claims mounted in the cylindrical space.

With this solution one or more of the above-mentioned objects can be achieved. Particularly, hereby a hose connector assembly with improved retention and sealing properties can is achieved.

Preferable further details of hose connector assembly and the seal ring have been introduced earlier above and will be introduced in the following, which further details can be combined with the hose connector assembly individually or in any combination.

In a preferred embodiment, said female coupling member comprises an internal threading, in particular delimiting the cylindrical space.

In a preferred embodiment, the outer diameter of the flange is greater than the inner diameter of the threading.

In a preferred embodiment, the female coupling member comprises a bottom opening.

In a preferred embodiment, the female coupling member comprises a circular abutment against which the seal ring is placed.

In a preferred embodiment, the hose connector assembly comprises a male coupling member placed in the cylindrical space and screwed against the seal ring such that the seal ring is compressed between the rim of the male coupling member and the abutment of the female coupling member.

BRIEF DESCRIPTION OF THE DRAWINGS

In the following, the present invention is further described by way of example and with reference to the attached drawings, in which.

The foregoing aspects, features, and advantages of the invention will be apparent from the drawings and the detailed description related there-to.

DETAILED DESCRIPTION

Figure 1:
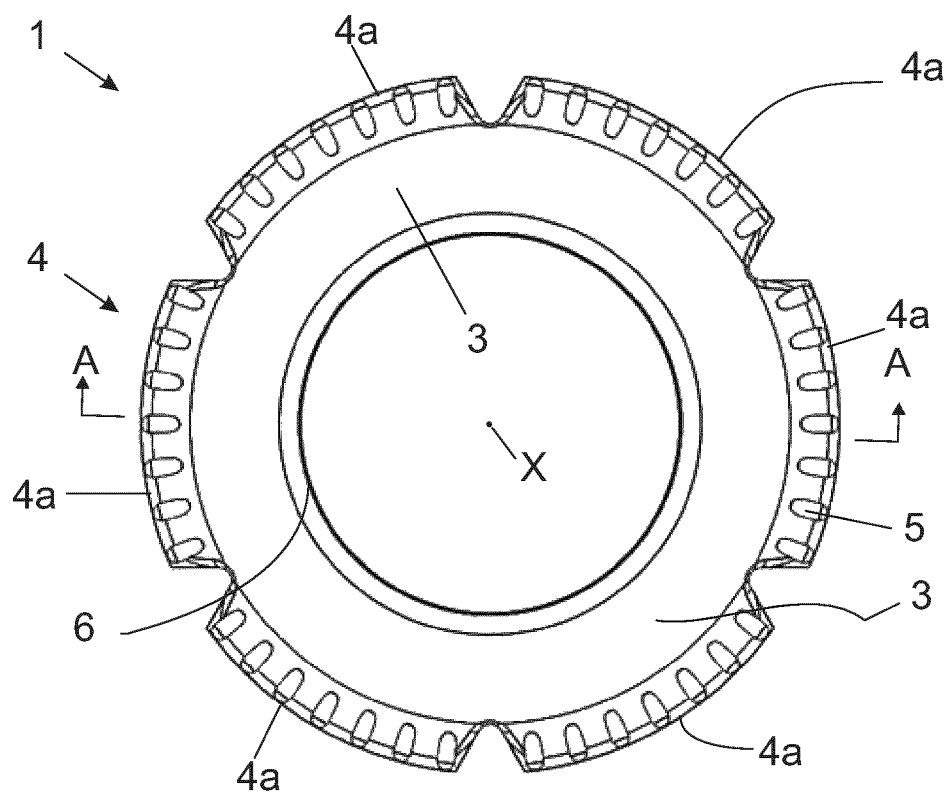
FIG. 1 illustrates a top view of an embodiment of the seal ring.

FIG. 1 illustrates an embodiment of a seal ring 1 having a central axis X and comprising an elastic ring member 2 made of elastic material. The elastic ring member 2 comprises an annular body portion 3 and a flange 4 surrounding the annular body portion 3, wherein the thickness t1 of the flange 4 is smaller than the thickness t2 of the annular body portion 3 as measured in axial direction of the seal ring 1. Such flange facilitates better retention qualities in the seal ring when installed. Particularly, the flange adapts to shape of a cylindrical space, such as a cylindrical space having inner threads of a female coupling member.

In the embodiment illustrated in FIG. 1, the flange 4 comprises a plurality of flange portions 4a distributed along the periphery of the annular body portion 3, each flange portion 4a extending radially outwards from the annular body portion 3. Owing to elasticity of the material of the elastic ring member 2, said flange portions 4a are able to individually conform, thus increasing the adaptability of the seal ring 1 when engaging with a female coupling member. For example, the seal ring adapts well in case of inconsistencies or damages in the inner threads of the female coupling member. The flange 4 comprises a cut out 8 between adjacent flange portions 4a.

The flange portions 4a preferably cover more than 50% of the periphery of the annular body portion 3, preferably at least 70%, and more preferably even more. The elastic ring member (2) preferably comprises at least 4 of said flange portions 4a, more preferably at least 6 of said flange portions 4a as illustrated in the presented embodiment in FIG. 1. The higher the number of the flange portions 4a, the better the adaptability of the seal ring 1. However, each added flange portion 4a also weakens the structure of the seal ring 1. For this reason, it is preferable that the elastic ring member 2 comprises only less than 10 of said flange portions 4a. It is advantageous that the flange 4 has plurality of portions, as described. However, this is not necessary, because alternatively, the flange 4 could be made to comprise a single continuous flange portion 4a surrounding the annular body portion 3, or more than 10 flange portions 4a.

In the embodiment illustrated in FIG. 1, the elastic ring member 2 comprises a rounded concave corner between the first and/or second axial side of each said flange portion 4a and the annular body portion 3. This improves the adaptability of the seal ring, as it allows the flange portions 4a to be shaped more consistently, thus making them conform easier.

Each said flange portion 4a comprises two opposite axial sides, and one or more of the flange portions 4a may comprise, on at least one of the two axial sides, plurality of protrusions 5. In the embodiment illustrated in FIG. 1, all flange portions 4a comprise on both sides said plurality of protrusions 5. The protrusions 5 increase surface area of the seal ring 1 further facilitating retention, particularly when engaging with inconsistent inner female threads, that are for example deformed or chipped. This is beneficial when using the seal ring in an aged coupling.

In the embodiment illustrated in FIG. 1 each flange portion 4a comprises 7 protrusions 5 on each of its axial side. Preferably each said flange portion 4a comprises on each of its axial side 3 to 20 of said protrusions 5, and each said flange portion 4a preferably comprises the same amount of protrusions 5.

In the embodiment illustrated in FIG. 1, said protrusions 5 are elongated ribs. The elongated ribs are oriented to point outwards from the central axis X of the elastic ring member 2. In the illustrated embodiment, each said elongated rib has a semi-circular cross section as viewed in longitudinal direction thereof. However, the shape presented in the embodiment is not required and said protrusions 5 could have alternative shapes, such as rectangular or circular shapes instead of ribs.

Figure 2:
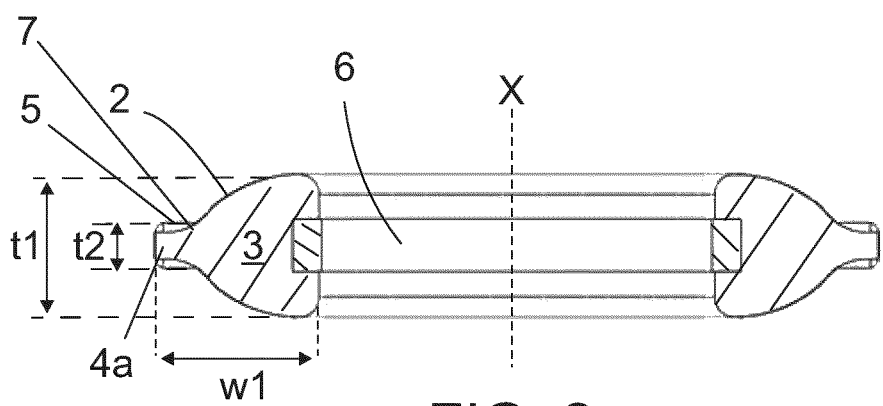
FIG. 2 illustrates a cross section A-A of the seal ring of FIG. 1.
Figure 3:
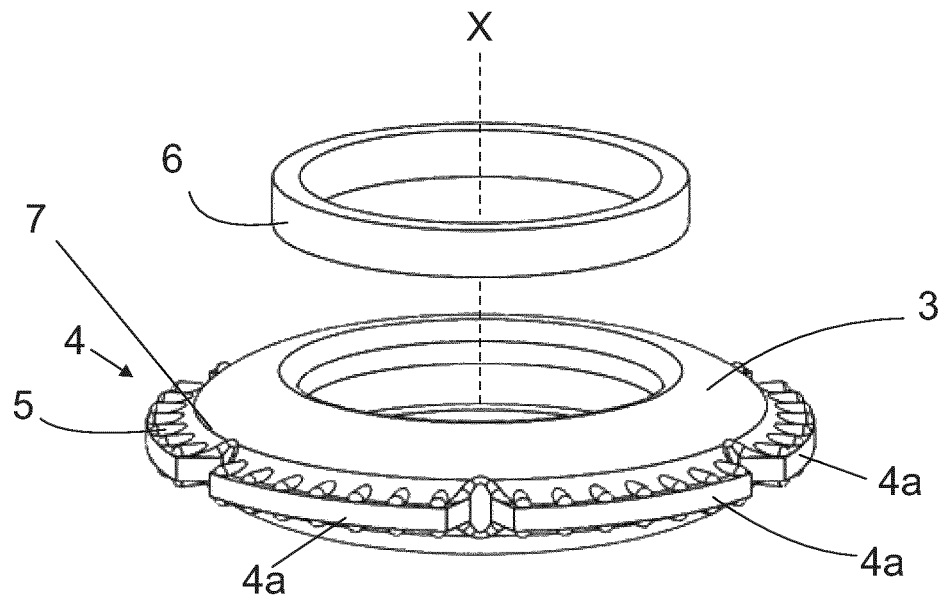
FIG. 3 illustrates an exploded perspective view of the seal ring of FIG. 1.
Figure 4:
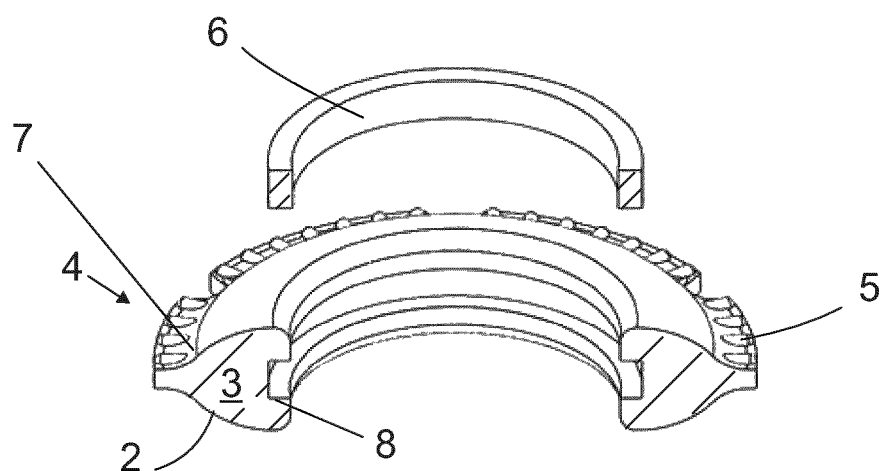
FIG. 4 illustrates an exploded perspective view of a cross section of the seal ring of FIG. 1.

The elastic ring member 2 extends around the axis X along a circular path with a constant or non-constant cross section, wherein the cross section is particularly the cross section on one radial side of the axis X as viewed along the tangent of the circle. The cross section referred to is visible in FIG. 2 on the left side of the axis x and marked with hatch-lines.

In the embodiment illustrated in FIG. 1 the width w1/thickness t1 ratio of the aforementioned cross section of the elastic ring member 2 at the point of each said flange portion 4a is greater than one, preferably greater than 1.10 as illustrated in FIG. 1. Great width results in a larger potential sealing surface area, thus facilitating accommodation of a range of coupling diameters and asymmetric male coupling member ends which can result from abrasive wear or deformation from a compressive force. In addition, the above described cross sectional profile allows the seal ring 1 to further resist rolling which is a common problem in seal members.

In the embodiment illustrated in FIG. 1, the aforementioned cross section of the elastic ring member 2, at the point of each said flange portion 4a, tapers towards its periphery. This further facilitates the retention qualities of the seal ring 1, as the periphery of the flange portions 4a is able to reach further into the inner threads of a female coupling member, thus increasing the engaging surface area.

In the embodiment illustrated in FIG. 1, the seal ring comprises a second ring member 6 coaxial with the annular body portion 3, made of material, which is harder than the elastic material. The harder second ring member allows the seal ring to better maintain its initial geometry and resist radial deformation that could be caused by over-tightening the coupling. The second ring member 6 also facilitates that the seal will not slice completely through, even if the elastic ring member 2 would be sliced through. The elastic ring member 2 and the second ring member 6 together facilitate simultaneously better retention qualities, better sealing qualities, and better longevity of the sealing ring. The second ring member 6 also helps to prevent rolling of the seal, when the flange is engaging with the inner threads of a female coupling member.

The seal ring 1 comprises a tubular opening extending through it along said central axis X. In the embodiment illustrated in FIG. 1 the annular body portion 3 and the rigid ring together define the tubular opening. This tubular opening allows a medium to flow through the seal ring.

In the embodiment illustrated in FIG. 1, the second ring member 6 is at least partially embedded in the annular body portion 3 of the elastic ring member 2. The annular body portion 3 comprises a recess 8 open towards the axis X, wherein the second ring member 6 is disposed.

In the embodiment illustrated in FIG. 1 the annular body portion 3 is rotationally symmetrical with respect to the axis X. Thus, the rotational position of the seal ring 1 with respect to the axis X does not affect the functioning of the seal when the coupling is engaged.

In the embodiment illustrated in FIG. 1 the cross section of the seal ring 1 is symmetrical with respect to a plane to which the axis X is orthogonal. In the illustrated embodiment, in said cross section the width of the annular body portion 3 is greater than the width of the flange portion 4a. In said cross section the width of the flange portion 4a is preferably at least 2 mm.

In the embodiment illustrated in FIG. 1, in the cross section described above, the thickness of the flange portion 4a is smaller than half of the thickness of the annular body portion 3, and the thickness of the flange portion 4a is smaller than the thickness of the second ring member 6.

Figure 5:
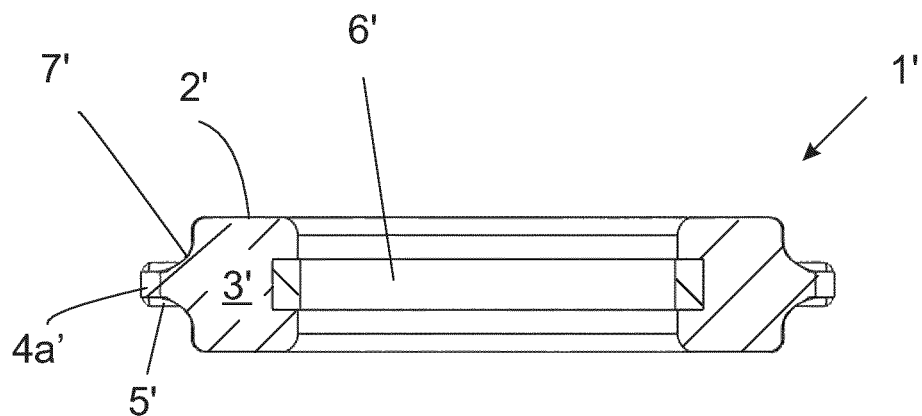
FIG. 5 illustrates a cross section of a second embodiment of the seal ring.

FIG. 5 illustrates a cross section of a second embodiment of the seal ring. In the second embodiment of the seal ring 1' illustrated in FIG. 5, axial sides of the annular body portion 3' are flat. Particularly, the axial sides of the annular body portion 3a' extend along a plane to which the axis X is orthogonal. The flat shape improves the ease of use in some use cases of the seal ring. Except for the difference that the axial sides of the annular body portion 3' are flat, the seal ring 1' is similar to what is shown and described referring to FIGS. 1-4.

The elastic ring member 2 may be injection molded on the second ring member 6. This creates a water-tight bond between the two components and adheres the two components together.

Said elastic material comprises elastomer, preferably silicone. Other materials could also be used, for example rubber, NBR, EPDM, TPU, TPR, TPE, or vinyl.

Shore A hardness of said elastic material is between 30 and 75, preferably between 50 and 75. This allows the flange portions 4a to individually conform.

The material of the second ring member comprises preferably polymer.

Shore A hardness of the material of the second ring member is higher than Shore A hardness of the elastic material. This gives structure to the seal ring 1 and facilitates better resisting of radial deformation.

The whole elastic ring member 2 is preferably made of same material.

Figure 6:
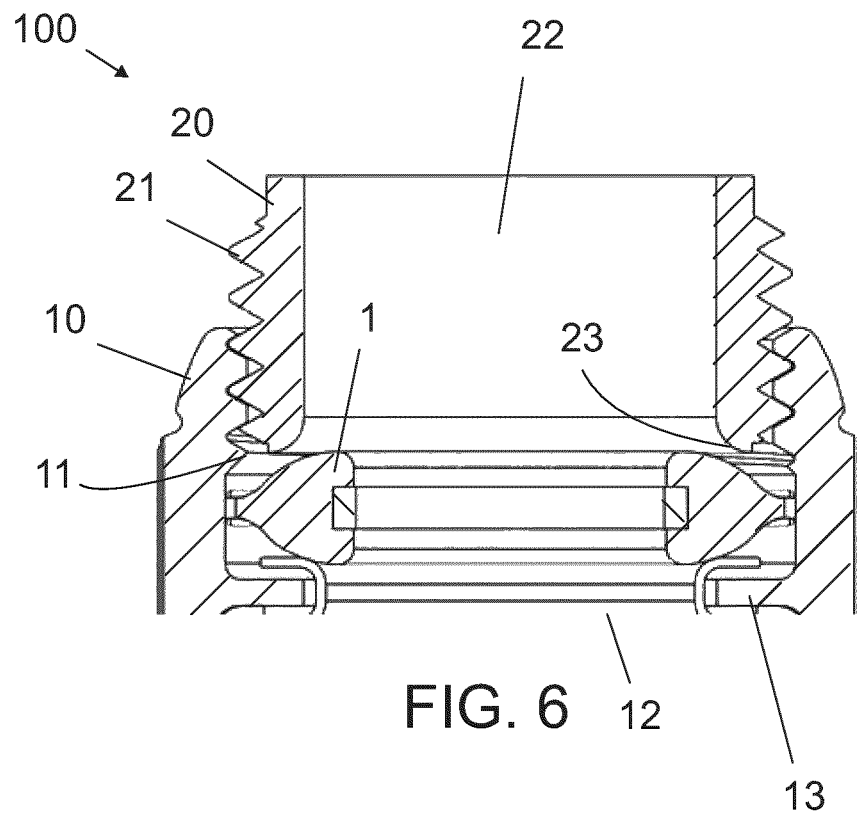
FIG. 6 illustrates a cross section of a hose connector assembly wherein the seal ring of FIG. 1 is arranged inside a female coupling member.

FIG. 6 illustrates a hose connector assembly 100 comprising a female coupling member 10 comprising a cylindrical space and the seal ring embodiment of FIG. 1 mounted in the cylindrical space. Said female coupling member 10 comprises an internal threading 11, in particular delimiting the cylindrical space.

In the hose connector assembly 100 of FIG. 6, the outer diameter of the flange 4 of the seal ring 1 is greater than the inner diameter of the threading 11. The flange 4 allows the seal ring 1 to be mounted by rotating it through the threads of the female coupling member 10. This allows a sealing ring of such size to be mounted, ensuring that the geometry will interact with the female coupling thread roots and will help lock the sealing system into place.

In the hose connector assembly 100 of FIG. 6, the female coupling member 10 comprises a bottom opening 12 and a circular abutment 13 against which the seal ring 1 is placed.

The hose connector assembly 100 of FIG. 6 further comprises a male coupling member 20 placed in the cylindrical space and screwed or at least screwable against the seal ring 1 such that the seal ring is compressed between the rim 23 of the male coupling member 20 and the abutment 13 of the female coupling member 10. In FIG. 6, the seal ring 1 becomes compressed as described when the male coupling member 20 is screwed downwards in the Figure.

Figure 7:
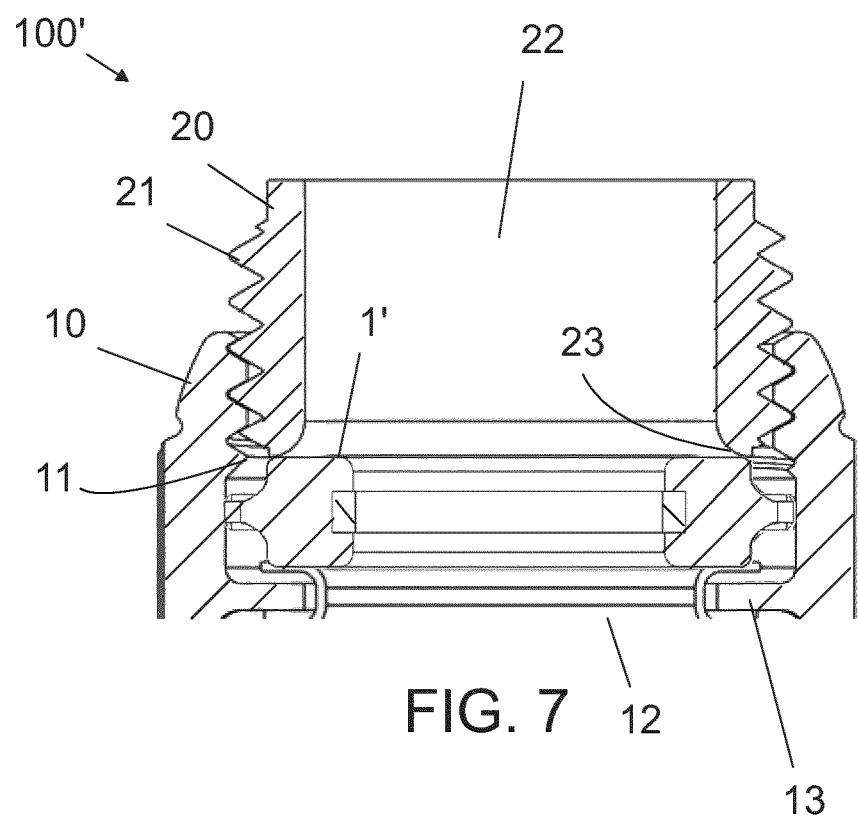
FIG. 7 illustrates a cross section of a hose connector assembly wherein the seal ring of FIG. 5 is arranged inside a female coupling member.

FIG. 7 illustrates a hose connector assembly 100' comprising a female coupling member 10 comprising a cylindrical space and the seal ring embodiment of FIG. 5 mounted in the cylindrical space. Said female coupling member 10 comprises an internal threading 11, in particular delimiting the cylindrical space.

In the hose connector assembly 100' of FIG. 7, the outer diameter of the flange 4' of the seal ring 1' is greater than the inner diameter of the threading 11. The flange 4' allows the seal ring 1' to be mounted by rotating it through the threads of the female coupling member 10. This allows a sealing ring of such size to be mounted, ensuring that the geometry will interact with the female coupling thread roots and will help lock the sealing system into place.

In the hose connector assembly 100' of FIG. 7, the female coupling member 10 comprises a bottom opening 12 and a circular abutment 13 against which the seal ring 1' is placed.

The hose connector assembly 100' of FIG. 7 further comprises a male coupling member 20 placed in the cylindrical space and screwed or at least screwable against the seal ring 1' such that the seal ring is compressed between the rim 23 of the male coupling member 20 and the abutment 13 of the female coupling member 10. In FIG. 7, the seal ring 1' becomes compressed as described when the male coupling member 20 is screwed downwards in the Figure.

The seal ring 1 is preferably installed between a male garden hose coupling member and a mating female coupling member.

It is to be understood that the above description and the accompanying figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in the light of the above teachings. It is therefore to be understood that the invention and its embodiments are not limited to the examples described above but may vary within the scope of the claims.

The invention claimed is:

1. A seal ring having a central axis and comprising:
   an elastic ring member made of elastic material and comprising:
   an annular body portion; and
   a flange surrounding the annular body portion, wherein the thickness of the flange is smaller than the thickness of the annular body portion as measured in axial direction of the seal ring;
   wherein the flange comprises a plurality of flange portions distributed along the periphery of the annular body portion, each flange portion extending radially outwards from the annular body portion, and
   wherein each said flange portion comprises two opposite axial sides, and one or more of the flange portions comprises, on at least one of the two axial sides, a plurality of protrusions.

2. The seal ring according to claim 1, wherein the elastic ring member comprises at least 4 of said flange portions.

3. The seal ring according to claim 1 wherein the flange portions cover more than 50% of the periphery of the annular body portion.

4. The seal ring according to claim 1 wherein the elastic ring member comprises a rounded concave corner between the first and/or second axial side of each said flange portion and the annular body portion.

5. The seal ring according to claim 1, wherein each said flange portion comprises on one of its axial side 3 to 20 of said protrusions.

6. The seal ring according to claim 1 wherein the width to thickness ratio of the cross section of the elastic ring member at the point of each said flange portion is greater than one.

7. The seal ring according to claim 1, wherein the cross section of the elastic ring member at the point of each said flange portion tapers towards its periphery.

8. The seal ring according to claim 1, comprising a second ring member coaxial with the annular body portion, made of material, which is harder than the elastic material.

9. The seal ring according to claim 8, wherein the second ring member is at least partially embedded in the annular body portion of the elastic ring member.

10. The seal ring according to claim 8, wherein the elastic ring member has been injection molded on the second ring member.

11. The seal ring according to claim 1, wherein said elastic material comprises an elastomer.

12. The seal ring according to claim 1, wherein Shore A hardness of said elastic material is between 30 and 75.

13. The seal ring according to claim 8, wherein Shore A hardness of the material of the second ring member is higher than Shore A hardness of the elastic material.

14. A hose connector assembly comprising a female coupling member comprising a cylindrical space and a seal ring mounted in the cylindrical space, the seal ring having a central axis and comprising:
   an elastic ring member made of elastic material and comprising:
   an annular body portion; and
   a flange surrounding the annular body portion, wherein the thickness of the flange is smaller than the thickness of the annular body portion as measured in axial direction of the seal ring;
   wherein the flange comprises a plurality of flange portions distributed along the periphery of the annular body portion, each flange portion extending radially outwards from the annular body portion, and
   wherein each said flange portion comprises two opposite axial sides, and one or more of the flange portions comprises, on at least one of the two axial sides, a plurality of protrusions.

15. The hose connector assembly according to claim 14, wherein said female coupling member comprises an internal threading delimiting the cylindrical space.

16. The hose connector assembly according to claim 15, wherein the outer diameter of the flange is greater than the inner diameter of the threading.

17. The hose connector assembly according to claim 16, wherein the female coupling member comprises a circular abutment against which the seal ring is placed.

18. The hose connector assembly according to claim 17, comprising a male coupling member placed in the cylindrical space and screwed against the seal ring such that the seal ring is compressed between the rim of the male coupling member and the abutment of the female coupling member.

* * * * *